(12) United States Patent
Carle et al.

(10) Patent No.: US 12,509,010 B2
(45) Date of Patent: Dec. 30, 2025

(54) THERMAL PROTECTION DEVICE FOR A QUICK COUPLING CONNECTOR

(71) Applicant: AKWEL, Champfromier (FR)

(72) Inventors: Alexandra Carle, Sorgues (FR); Jérémy Dreux, Beaumes de Venise (FR)

(73) Assignee: AKWEL, Champfromier (FR)

( * ) Notice: Subject to any disclaimer, the term of this patent is extended or adjusted under 35 U.S.C. 154(b) by 194 days.

(21) Appl. No.: 18/379,259

(22) Filed: Oct. 12, 2023

(65) Prior Publication Data
US 2024/0123927 A1 Apr. 18, 2024

(30) Foreign Application Priority Data

Oct. 18, 2022 (FR) ...................................... 2210733

(51) Int. Cl.
| | |
|---|---|
| *F16L 57/04* | (2006.01) |
| *B60R 16/08* | (2006.01) |
| *F16L 57/00* | (2006.01) |
| *F16L 59/18* | (2006.01) |
| *F16L 59/11* | (2006.01) |
| *F16L 59/14* | (2006.01) |

(52) U.S. Cl.
CPC ............ *B60R 16/08* (2013.01); *F16L 57/005* (2013.01); *F16L 57/04* (2013.01); *F16L 59/188* (2013.01); *F16L 59/11* (2013.01); *F16L 59/145* (2013.01)

(58) Field of Classification Search
CPC ......... F16L 57/005; F16L 57/04; F16L 59/06; F16L 59/11; F16L 59/145; F16L 59/188; F16L 2201/20
See application file for complete search history.

(56) References Cited

U.S. PATENT DOCUMENTS

| | | | | |
|---|---|---|---|---|
| 3,177,900 A | * | 4/1965 | Sharp ...................... | F16L 57/04 428/920 |
| 3,712,649 A | | 1/1973 | Martin | |
| 5,649,510 A | * | 7/1997 | Linze ...................... | F02N 11/00 310/52 |
| 8,875,744 B2 | * | 11/2014 | Taagepera ............... | F16L 59/06 138/110 |
| 10,408,339 B2 | * | 9/2019 | Saxon ................. | F16H 61/0206 |
| 10,731,785 B2 | * | 8/2020 | Vogl ....................... | F16L 3/003 |
| 2007/0001453 A1 | * | 1/2007 | Miyajima ............. | F16L 57/005 285/319 |

(Continued)

FOREIGN PATENT DOCUMENTS

| | | |
|---|---|---|
| EP | 3 124 862 A1 | 2/2017 |
| FR | 3038361 A1 * 1/2017 | ......... F01N 13/1822 |
| JP | 2001-182881 A | 7/2001 |

(Continued)

OTHER PUBLICATIONS

Machine translation of KR 20210095404.*
Machine translation of FR 3038361.*

*Primary Examiner* — Kevin F Murphy
(74) *Attorney, Agent, or Firm* — Oliff PLC

(57) ABSTRACT

A thermal protection device includes a cover including a wall, according to a longitudinal axis, with a rear portion adapted to be mounted on the connector so as to surround it at least partially and with a front portion adapted to be mounted on the tubular element and to hold it by a mechanical connection.

12 Claims, 3 Drawing Sheets

(56) References Cited

U.S. PATENT DOCUMENTS

2008/0098721 A1\* 5/2008 Liu .................... F01N 13/14
  60/272
2015/0176747 A1 6/2015 Nagaya et al.

FOREIGN PATENT DOCUMENTS

JP 2006-22911 A 1/2006
KR 20210095404 A \* 8/2021 .............. F16L 57/04

\* cited by examiner

THERMAL PROTECTION DEVICE FOR A QUICK COUPLING CONNECTOR

The present invention primarily relates to connecting two elements together, in particular to connect with quick coupling tubular pipes of a fluid circulation circuit for a member of a motor vehicle. More particularly yet non-exclusively, the invention applies to connecting tubular pipes for a thermal regulation circuit of a "battery pack" for an electric motor vehicle comprising an electric motor electrically powered by the "battery pack".

Fighting atmospheric pollution has led many car manufacturers to develop fuel-efficient vehicles, and even vehicles with no internal combustion engines. Thus, an increasing number of production vehicles include an electric motor, either as a unique drive means to equip electric vehicles, or in combination with an internal combustion engine to equip hybrid vehicles.

Such vehicles require a battery comprising electrochemical accumulators, also referred to as battery cells or elements, which enables the storage of a large amount of electrical energy to power their electric motor.

By their high voltage and their high energy density, the electrochemical accumulators, for example of the Lithium-ion (Li-ion) type, are particularly suited to power the drivetrain of an electric or hybrid vehicle. In such an accumulator, a Li-ion cell is an elementary component, which encloses a given amount of electrolyte, through which lithium ions could migrate between a cathode and an anode, in order to store or deliver electrical energy.

In a Li-ion accumulator, a plurality of Li-ion cells are first assembled and connected in series and/or in parallel to form a module, then a plurality of modules are assembled and connected in series and/or in parallel to form a "pack" in Anglo-Saxon terminology. Thus, a battery "pack" generally includes several modules connected together, themselves consisting of several cells connected together and a support structure of its different elements.

In general, the "pack" includes many fluid circuits, in particular for the thermal regulation of the battery elements. These circuits include tubular elements to be quickly interconnected, in particular with quick connectors or quick coupling connectors (known as "quick connector" in Anglo-Saxon terminology) while allowing guaranteeing sealing of these fluid circuits.

In the event of failure of one or more cell(s) in a "pack" of the battery; a thermal runaway phenomenon might occur inside the cells. This thermal runaway phenomenon might propagate to the entire "pack" and result in a fire as the cells exceed a critical temperature threshold. As this consists of a chemical-origin fire, it is very difficult to extinguish it, especially when considering that it is confined in the almost hermetically-sealed enclosure formed by the "pack".

Consequently, it is necessary to guarantee that the thermal regulation circuits of the "pack" could be preserved as long as possible from degradations and damages related to exposure to extreme temperatures for example upon start of a fire in the "pack".

The invention aims to provide a simple, reliable and inexpensive solution to solve this technical problem.

DESCRIPTION OF THE INVENTION

To this end, an object of the invention is a thermal protection device for a quick coupling connector with at least one tubular element, in particular of a thermal regulation circuit of a battery pack for a motor vehicle, comprising a cover comprising a wall provided, according to a longitudinal axis, with a first portion adapted to be mounted on the connector so as to surround it at least partially and with a second portion adapted to be mounted on the tubular element and to hold it by a mechanical connection, characterized in that in the mounted state, the distance separating the wall of the cover and the connector and/or the tubular element is different from zero in order to create a spacing air gap and in that the second portion internally supports a clipping member adapted to be mounted on the tubular element and to hold it by a clipping mechanical connection.

The device according to the invention ray further include one or more of the following features.

According to a preferred embodiment of the invention, in the mounted state, the distance separating the wall of the cover of the connector and/or of the tubular element is different from zero in order to create a spacing air gap.

According to a preferred embodiment of the invention, the wall of the cover has, according to a transverse section, a U-like general shape open downwards.

According to a preferred embodiment of the invention, the second portion internally supports a clipping member adapted to be mounted on the tubular element and to hold it by a clipping mechanical connection.

According to a preferred embodiment of the invention, the clipping member is made integrally in one-piece with the wall of the cover.

According to a preferred embodiment of the invention, the clipping member has a clamp-like general shape.

According to a preferred embodiment of the invention, the clipping member extends internally at a spacing distance from the wall of the cover.

According to a preferred embodiment of the invention, the clipping member comprises a clamp with an "omega"-like general shape with a top portion extending downwards by two clamp branches and is connected by a material bridge by its top portion to the wall of the cover.

According to a preferred embodiment of the invention, the clipping member is obtained by folding a material strip extending longitudinally from one edge of the wall of the cover, the material strip delimiting a proximal portion configured to form the material bridge and a distal portion configured to form the clipping member, the strip being folded in two in the proximal portion so as to bring the distal portion opposite an internal surface of the wall of the cover and the distal portion being folded like a clamp.

According to a preferred embodiment of the invention, the cover is made of a material essentially comprising stainless steel or surface-treated steel.

According to a preferred embodiment of the invention, the cover is configured to be molded into one-piece by injection of a plastic material.

According to a preferred embodiment of the invention, the cover is made of a thermosetting plastic material comprising a reinforcing component consisting of fibers and/or beads and/or powders of glass, calcium carbonate, mica and/or talc.

According to a preferred embodiment of the invention, the first portion of the cover is internally provided with feet for wedging the connector inside the cover.

According to a preferred embodiment of the invention, the wedging feet extend at a spacing distance with respect to an inner surface of the wall of the cover.

According to a preferred embodiment of the invention, each wedging foot is formed by a fold of a material strip extending from one edge of the wall of the cover towards the inside of the cover.

Another object of the invention is a set comprising a quick coupling connector, a tubular element provided with a fitting cooperating with a complementary fitting of the connector, characterized in that the set further comprises a thermal protection device according to the invention.

According to a preferred embodiment of the invention, the tubular element comprises a thermal protection sheath, for example made by superposing a layer of glass fibers and a silicon layer.

The invention will be better understood and its advantages will appear better, upon reading the following detailed description of some embodiments shown as non-limiting examples. The description refers to the appended drawings wherein:

FIG. 1 Figure is a perspective view of a connector set comprising a thermal cover according to the invention.

DETAILED DESCRIPTION OF THE INVENTION

In FIGS. 1 to 6, a set for a fluid circulation circuit is shown, comprising a quick coupling connector and a tubular element provided with a fitting cooperating with a complementary fitting of the connector. In the following description, this set will be referred to by the general reference 10.

In the example illustrated by the figures, the quick coupling connector bears the reference 100 and the tubular element bears the reference 20.

Figure 1:
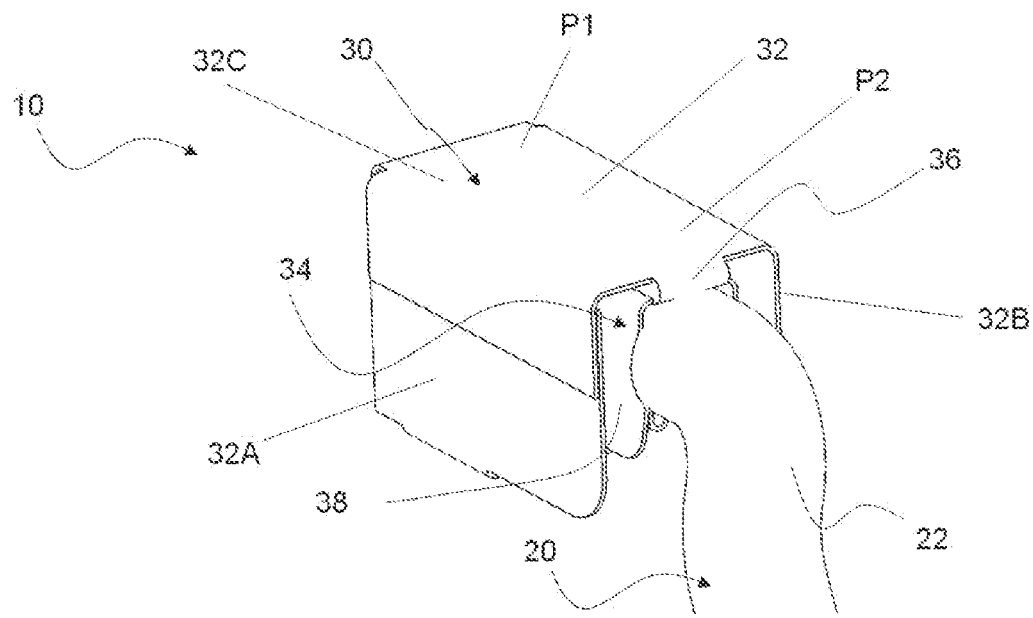
Figure 2:
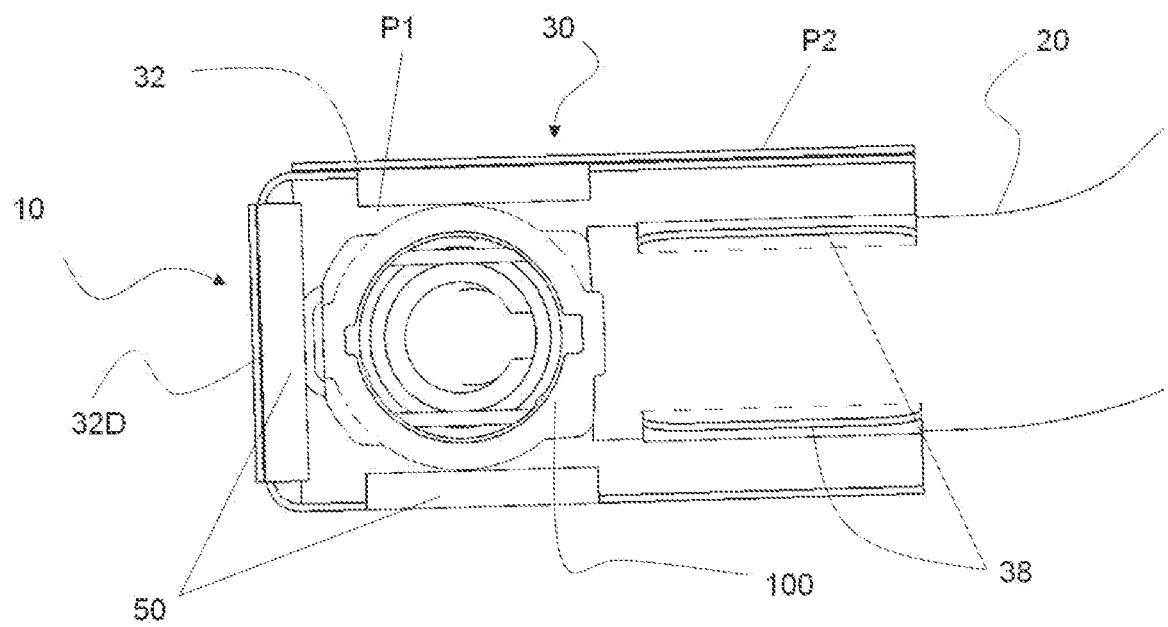
FIG. 2 is a bottom view of the connector set of FIG. 1.
Figure 3:
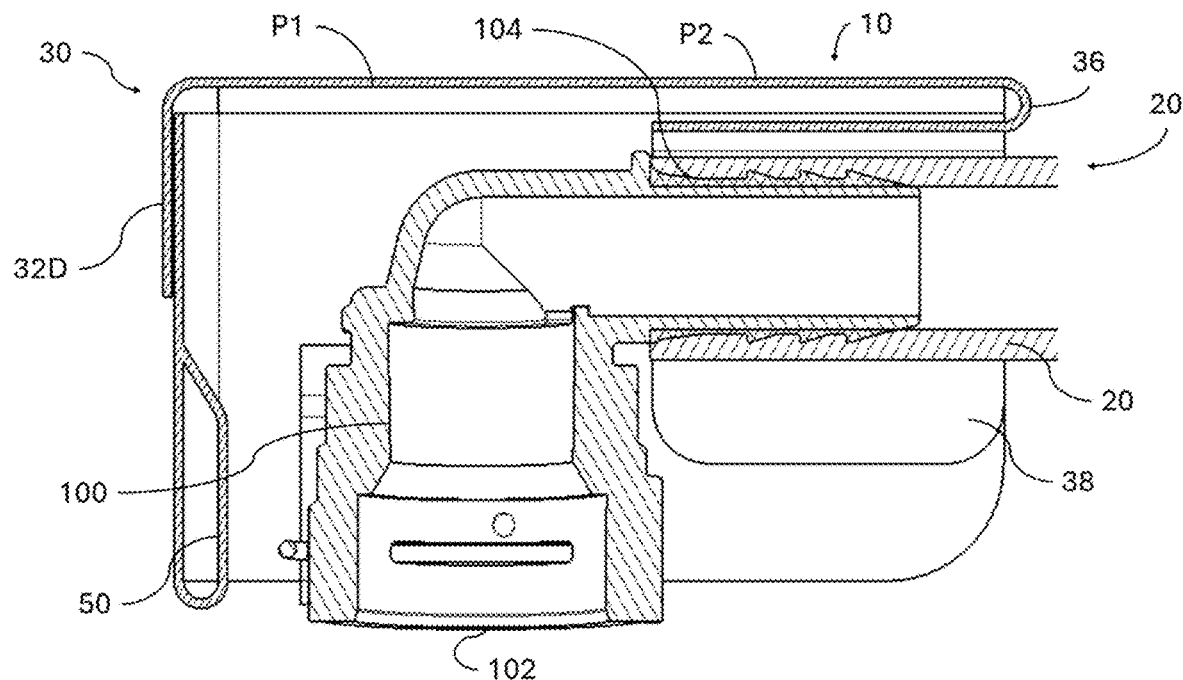
FIG. 3 is a longitudinal sectional view of the set of FIG. 1.

In the illustrated example, as shown in FIG. 3, the connector 100 comprises a body having at a first end 102 a sleeve female connector configured to receive a male fluid line element (not shown) and is provided at a second end 104 with a male fitting for connecting to another fluid line element such that the tubular element 20 formed by a flexible hose. In the illustrated example, the male fitting 104 comprises an outer surface shaped for fitting of the flexible hose 20 and comprises, over this outer surface, means for axially holding the flexible hose 20. For example, one could see in FIG. 3 that the male fitting 104 has a fir tree type stepped relief intended to receive the flexible hose 20 by fitting. In this illustrated example, the male fitting 104 extends according to a main axis forming a deflection angle with a main axis along which the sleeve female connector 102 extends. For example, the angle is a right angle or in a non-illustrated variant a zero angle.

More particularly yet not exclusively, this invention applies to the technical field of thermal regulation of a battery pack of a motor vehicle. In the preferred embodiment of the invention, the set 10 comprising the tubular element 20 and the connector 100 is part of a thermal regulation circuit of the battery pack.

More particularly, according to the invention, in order to thermally protect the thermal regulation circuit of the automotive vehicle, the set 10 further comprises a thermal protection device 30.

In particular, the device 30 comprises a cover comprising a wall 32 provided, according to a longitudinal axis, with a first portion at the rear P1 adapted to be mounted on the connector 100 so as to surround it at least partially and with a second portion at the front P2 adapted to be mounted on the tubular element 20 and to hold it by a mechanical connection.

In one variant which is not illustrated in the figures, the connector 100 may be a T-shaped connector and the cover 30 may comprise in this case a first central portion P1' adapted to be mounted on the connector 100 and second and third lateral portion P2' adapted to be mounted on each of the tubular elements 20 each coupled to one branch of the connector 100.

As shown in FIGS. 1 to 6, the wall 32 of the cover 30 has, according to a cross-section, a U-like general shape open downwards. In the preferred embodiment of the invention, the wall 32 comprises a cover wall 32C and two lateral walls 32A and 32B.

Furthermore, in the preferred embodiment of the invention, preferably, the wall 32 also comprises a dorsal wall 32D closing the cover 32 at the rear, Thanks to this dorsal wall 32D, the connector 100 is thermally protected over an entire periphery.

Preferably, in the mounted state, the distance separating the wall 32 of the cover 30 and the connector 100 and/or the tubular element 20 is different from zero in order to create a spacing air gap. This air gap allows thermally insulating the connector 100 and/or the tubular element 20 then allowing slowing down the propagation of the external temperature to the surface of the connector 100 or to the surface of the tubular element 20.

In the preferred embodiment of the invention, the front portion P2 internally supports a clipping member 34 adapted to be mounted on the tubular element 20 and to hold it by a clipping mechanical connection.

Figure 4:
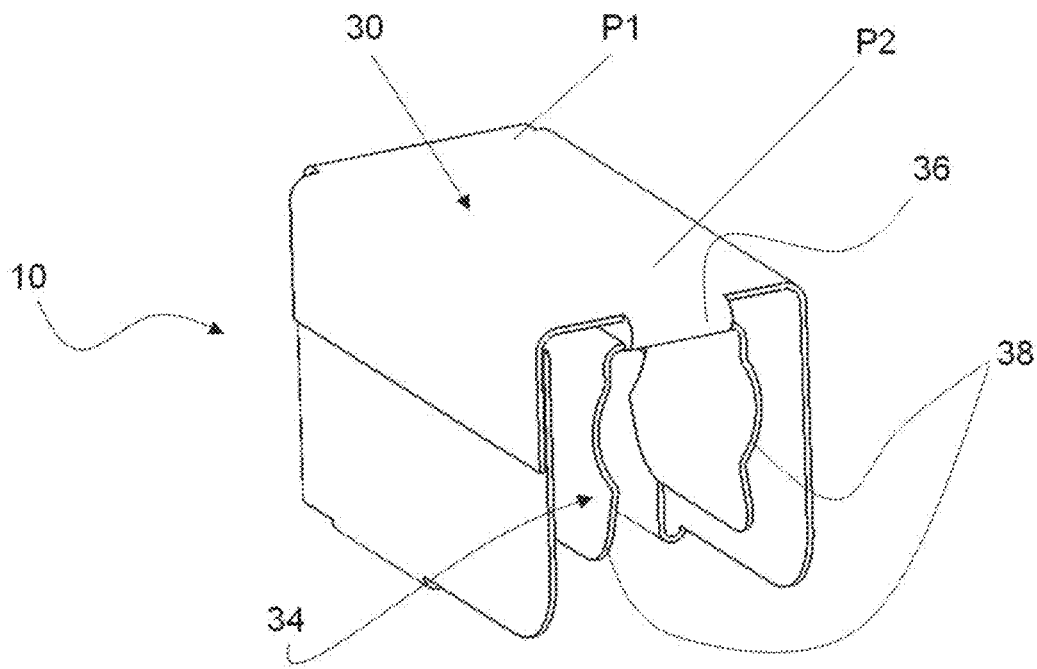
FIG. 4 is a perspective view of the thermal protection cover.
Figure 5:
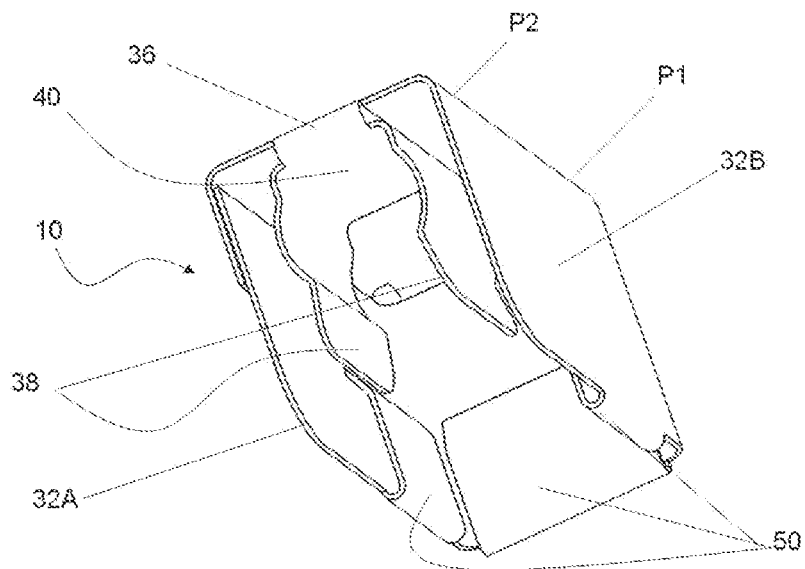
FIG. 5 is a perspective view of the cover of FIG. 4 according to another viewpoint.
Figure 6:
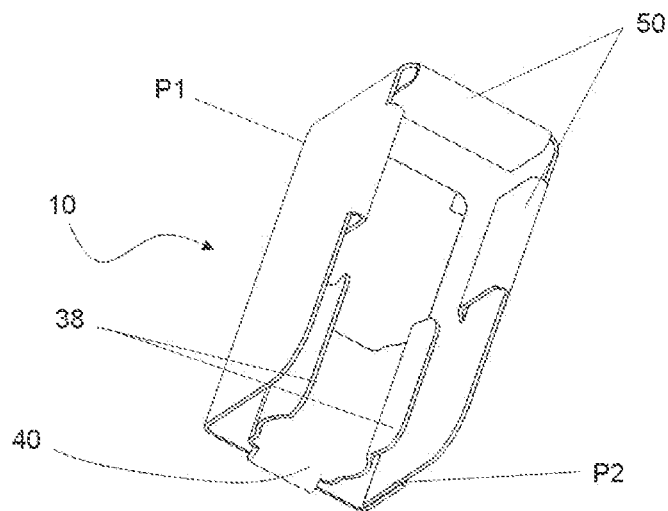
FIG. 6 is a bottom view of the cover of FIG. 1.

As shown in FIGS. 4 and 5, the clipping member 34 has a clamp-like general shape. Preferably, in order to ensure a relative heat insulation of the member 34 and of the wall 32 of the cover 30, the clipping member 34 extends internally at a distance from the wall 32 of the cover 30. This spacing distance formed between the wall 32 and the clipping member 34 has the advantage of creating a heat-insulating air gap which will effectively limit the propagation of the heat of the wall 32 towards the clipping member 34 and therefore towards the tubular element 20.

In the illustrated example, the clipping member 34 is made integrally in one-piece with the wall of the cover 32. For example, the clipping member 34 comprises a clamp having a cross-section with an "omega"- or "C"-like general shape with a top portion 40 extending downwards by two clamp branches 38 and is connected by a material bridge 36 by its top portion 40 to the wall 32 of the cover 30.

Preferably, the cover 30 is made of a metallic material. For example, the cover 30 is made of a material essentially comprising stainless steel or surface-treated steel. In the described example, the clipping member 34 is thus obtained by folding a material strip extending longitudinally from one edge of the wall 32 of the cover 30, the material strip delimiting a proximal portion configured to form the material bridge 36 and a distal portion configured to form the clipping member 34, the strip being folded in two in the proximal portion so as to bring the distal portion opposite an internal surface of the wall 32 of the cover 30 and the distal portion being curved in two to form the clamp branches 38.

Furthermore, preferably, the rear portion P1 of the cover 30 is internally provided with feet 50 for wedging the connector 20 inside the cover 30. For example, the wedging feet 50 extend at a distance from an inner surface of the wall 32 of the cover 30. This spacing distance formed between the wall 32 and the fold 50 has the advantage of creating a heat-insulating air gap, which will effectively limit the propagation of heat from the wall 32 towards the fold 50 and therefore towards the connector 100.

In the preferred embodiment of the invention, each wedging foot 50 is, for example, formed by a fold, towards the inside of the cover 30, of a material strip extending from one edge of the wall 32 of the cover 30.

In a variant of the invention which is not illustrated, the cover 30 is made of a thermosetting material comprising a reinforcing component consisting of fibers and/or beads and/or powders of glass, calcium carbonate, mica and/or talc. In this case, for example, the cover 30 is made so as to be molded into one-piece by injection of a plastic material.

Preferably, the tubular element 20 also comprises a thermal protection sheath, for example comprises a thermal protection sheath, for example made by superposing a glass fiber layer and a silicone layer.

The main aspects of operation of a set according to the invention will now be described with reference to FIGS. 1 to 6.

The set 10 comprises the quick coupling connector 100, the tubular element 20, in the form of a flexible hose provided with a fitting which is adapted to cooperate with a complementary fitting 104 of the connector 100.

Initially, the tubular element 20 is covered with a thermal protection sheath. Thus, the connector 100 and the tubular element 20 are coupled to each other, for example by fitting the fir-tree end 104 of the connector 100 into the flexible hose 20 formed by the tubular element 20.

Afterwards, the thermal protection device or cover 30 is mounted on the set 10 comprising the tubular element 20 and the connector 100. The rear portion P1 is assembled around the connector 100 and the front portion P2 is mounted on the flexible hose 20, preferably by clipping thanks to the member 34.

The cover 30 then serves as a heat shield which then prevents a very rapid damaging of the set 10 in the vent of exposure to extreme temperatures.

Of course, the invention is not limited to the previously-described embodiments. Other embodiments within the reach of a person skilled in the art may also be considered without departing from the invention defined by the claims hereinafter.

The invention claimed is:

1. A thermal protection device for a quick coupling connector with at least one tubular element comprising
   a cover comprising a wall provided, according to a longitudinal axis, with a first portion adapted to be mounted on the connector to surround the connector at least partially and with a second portion adapted to be mounted on the tubular element and to hold the tubular element by a mechanical connection, wherein
   in a mounted state, the distance separating the wall of the cover and the connector and/or the tubular element is different from zero to create a spacing air gap and in that the second portion internally supports a clipping member adapted to be mounted on the tubular element and to hold the tubular element by a clipping mechanical connection,
   the clipping member comprises a clamp with an omega-like general shape with a top portion extending downwards by two clamp branches and is connected by a material bridge by the top portion to the wall of the cover, and
   the clipping member comprises a material strip folded and extending longitudinally from one edge of the wall of the cover, the material strip delimiting a proximal portion configured to form the material bridge and a distal portion configured to form the clipping member, the strip being folded in two in the proximal portion to bring the distal portion opposite an internal surface of the wall of the cover and the distal portion being folded to form the clamp.

2. The device according to claim 1, wherein the wall of the cover has, according to a transverse section, a U-like general shape open downwards.

3. The device according to claim 1, wherein the clipping member is made integrally in one-piece with the wall of the cover.

4. The device according to claim 1, wherein the clipping member extends internally at a spacing distance from the wall of the cover.

5. The device according to claim 1, wherein the cover is made of a material comprising stainless steel or surface-treated steel.

6. The device according to claim 1, wherein the cover is molded into one-piece by injection of a plastic material.

7. The device according to claim 6, wherein the cover is made of a thermosetting plastic material comprising a reinforcing component consisting of fibers and/or beads and/or powders of glass, calcium carbonate, mica and/or talc.

8. The device according to claim 1, wherein the first portion of the cover comprises internal feet for wedging the connector inside the cover.

9. The device according to claim 8, wherein the feet extend at a spacing distance with respect to an inner surface of the wall of the cover.

10. The device according to claim 8, wherein each of the feet is a fold of the material strip extending from one edge of the wall of the cover towards the inside of the cover.

11. A set comprising a quick coupling connector, a tubular element with a fitting cooperating with a complementary fitting of the connector, and the device according to claim 1.

12. The set according to claim 11, wherein the tubular element comprises a thermal protection sheath.

* * * * *